(12) United States Patent
Nakamichi

(10) Patent No.: US 7,841,127 B1
(45) Date of Patent: Nov. 30, 2010

(54) SOFT BAIT CONNECTOR FOR A FISHING HOOK

(75) Inventor: Shigeyuki Nakamichi, Nishiwaki (JP)

(73) Assignee: Owner American, Inc., Costa Mesa, CA (US)

( * ) Notice: Subject to any disclaimer, the term of this patent is extended or adjusted under 35 U.S.C. 154(b) by 0 days.

(21) Appl. No.: 11/936,958

(22) Filed: Nov. 8, 2007

(51) Int. Cl.
*A01K 83/06* (2006.01)

(52) U.S. Cl. .................. 43/44.8; 43/42.24; 43/44.2

(58) Field of Classification Search .............. 43/42.24, 43/42.37, 43.16, 44.2, 44.8
See application file for complete search history.

(56) References Cited

U.S. PATENT DOCUMENTS

| | | | | |
|---|---|---|---|---|
| 103,645 A | * | 5/1870 | Muscroft | 24/598.1 |
| 2,531,995 A | * | 11/1950 | Sweetman | 43/44.8 |
| 2,745,208 A | * | 5/1956 | Zech | 43/44.8 |
| 2,922,247 A | * | 1/1960 | Buss | 43/44.8 |
| 3,396,485 A | * | 8/1968 | Kuntz | 43/44.8 |
| 3,399,483 A | * | 9/1968 | Naffziger | 43/44.4 |
| 4,334,381 A | * | 6/1982 | Carver et al. | 43/42.29 |
| 5,152,094 A | * | 10/1992 | Strickland | 43/42.24 |
| 5,218,780 A | * | 6/1993 | Jacobson | 43/44.4 |
| 5,220,743 A | * | 6/1993 | McClellan | 43/44.81 |
| 5,274,947 A | * | 1/1994 | Griffiths | 43/44.2 |
| 5,784,827 A | * | 7/1998 | Jimenez et al. | 43/44.8 |
| 5,950,351 A | * | 9/1999 | Walker et al. | 43/44.2 |

* cited by examiner

*Primary Examiner*—Christopher P Ellis (57) ABSTRACT

The present invention is a fishing hook rig where a connector is formed with a spiral wire surrounding a portion of a straight wire pin and the connector is fixed at one end to a top end of a fishing hook. A soft bait is first fixed to the connector and then to a barbed end of the hook to provide a secure, snag resistant rig for fishing.

10 Claims, 6 Drawing Sheets

SOFT BAIT CONNECTOR FOR A FISHING HOOK

BACKGROUND OF THE INVENTION

The present invention relates to features of a fishing hook, more particularly structures for maintaining a position of a soft bait on a fishing hook.

The prior art describes that a soft plastic or elastomeric shape may be used as a lure when securely attached to a fishing hook. These soft plastic or elastomeric shapes have come to be known as "soft baits", partly because they may be compressed, stretched, and even broken in two with the force supplied by a user's hands. Soft baits are often colored and made into shapes similar to live baits used by fishermen. A popular and highly effective soft bait is one formed like a relatively long worm such as a night crawler. Other well known shapes of soft baits include a crawfish, insects, salamanders, small to mid size fish, as well as shapes that have no known analog to a live bait. It has been speculated that soft baits do not act like their live bait analogs when being drawn through the water to attract game fish. However, soft baits as they are drawn through the water do in fact attract game fish very well, even when many other baits and lures do not work at all.

Soft baits usually consist of a single soft and elastomeric material or polymer, typically a plastisol polyvinyl chloride. The soft and pliable nature of soft baits make them easy to lose or come loose in typical fishing situations. Carolina and Texas "riggin" or rigging are forms of setting a fishing hook in a soft bait. Generally, the object of these forms of rigging is to connect the soft bait to specific locations on the hook to maximize security (the tendency to stay connected to a hook) and obstacle shielding (avoiding hooking underwater weeds and branches). It is well known to introduce a fishing hook point in a soft bait and draw the hook through the soft bait until a part of the soft bait is located covering or near the hook's fishing line connector. Another part of the soft bait is simultaneously or later drawn onto the hook point to shield it from underwater weeds or branches.

The above forms of rigging are effective for attracting fish and avoiding underwater obstructions to some degree. However, the simple act of dragging of the soft bait underwater for retrieving often pulls the soft bait from its forward position covering or near the hook's fishing line connection. This act in turn pushes the soft bait covering the hook point from its shielding position. The hook point shielding is lost and the intended form is drastically changed so that the entire hook and soft bait wobble and/or twist instead of moving smoothly through the water. There is a need for a structure to improve the security of soft baits on fishing hooks.

As disclosed in U.S. Pat. No. 4,244,133, it has long been known to use a spiral metal wire fixed to a top part of a hook in an attempt to connect a top part of a soft bait close to the fishing line connection while the lower part of the soft bait is fixed to the barbed end of the hook. This dual connection serves an important purpose. A tubular soft bait, such as those imitating earthworms, has a longitudinal axis that is maintained relatively co-linear with the axis of the fishing line pulling the hook through the water. The devices disclosed in U.S. Pat. Nos. 4,873,783, 5,379,544, and 6,138,399 disclose various other ways to accomplish this co-linear arrangement.

However, it has been found that these prior art forms of co-linear and dual connection attachment for a soft bait to a fishing hook fail in actual use quite often. There is also a need for a forward connection device near the top of the hook that more effectively secures the top of a soft bait thereat with minimal cost and additional structure.

Fish that are likely to be drawn to soft baits often gather in areas of underwater plants, weeds and branches. These fish seek protection from other predator fish and waterfowl. While soft baits are effective, their use can be limited where a user suspects that they will lose their soft bait by water drag or contact with underwater weeds or branches. Prior art devices have not effectively supported soft baits on relatively slender fishing hooks from these underwater hazards.

SUMMARY OF THE INVENTION

The present invention is a fishing hook bearing from its upper end, preferably from its eyelet formed for securing to a fishing line, a coil of metal defining an open space core along its axis, wherein a metal pin extends through the axis of said open space core and beyond a free end of the coil. The presence of the metal pin dramatically improves the retention of a soft bait on the coil as compared with prior art devices. In a preferred form, the coil and metal pin are formed from a single, continuous piece of metal wire.

It is an object of the invention to improve the retention and alignment of soft bait on a fishing hook and thereby eliminate snagging potential of an entire fishing rig.

Another object of the invention is to form a snag-resistant rig which will easily set in a fish mouth.

Another object of the invention is to reduce the cost and complexity of forming a snag-resistant rig by forming securing means for an upper end of a soft bait by way of a single, continuous metal wire formed into a coil with a metal pin extending its interior length.

Another object of the invention is to dramatically improve the structure of securing means at an upper part of a fishing hook for a plastisol-based soft bait by way adding to the prior art "corkscrew" connector an longitudinal pin which reduces the likelihood that the spiral portion will pull free from the soft bait.

It is well known in the art of corkscrews for wine corks that lateral or rocking motion will crush and pulverize cork structure critical to pulling the cork free. This lateral motion is common in the action upon soft baits secured to fishing hooks. A prime reason for the failure of "corkscrew" connections found in U.S. Pat. No. 4,244,133 is that the lateral motion common to fishing damages the plastisol soft baits in the same way that a corkscrew damages wine corks. The present invention eliminates much of that damage by stabilizing the plastisol in the core of the spiral portion of the invention connector.

However, the prior art coil connectors found in the '133 patent are widely used and accepted by the fishing industry. A major problem in retrofitting existing hooks with such a device has been the lack of an adequate means to fix the eye of the coil to the eye of the hook. It is an alternate embodiment of the invention to provide secure means for attaching the invention connector and the prior art connector to an existing hook without the need for special tools.

It is a further object of the invention to reduce the chance that the line connected to the hook at the eye will become entangled in a coil or spring associated with an upper part of the hook while fighting to bring in a hooked fish.

It is a further object of the invention to prevent shear damage to an inside part of a soft bait by providing a connector to an upper part of a fishing hook by providing an inner core pin within a spiral which is connected by way of a rotating motion by a user.

DETAILED DESCRIPTION OF THE INVENTION

The invention is now discussed with reference to the figures.

Figure 1:
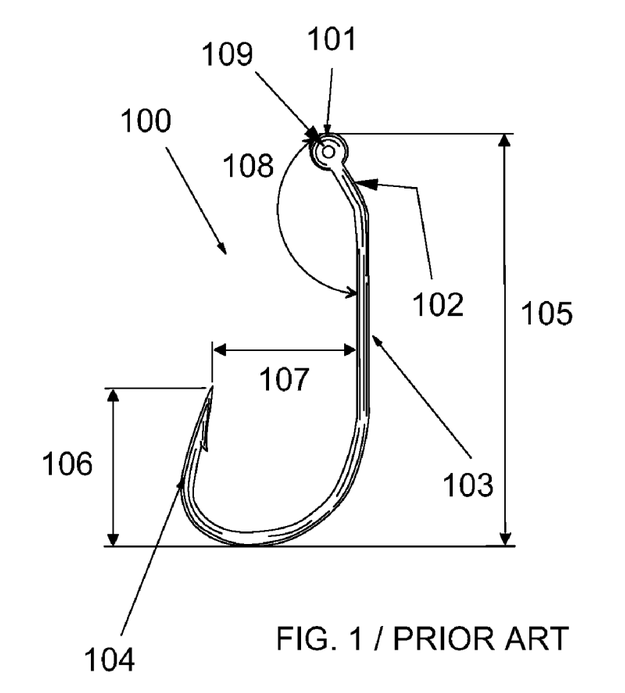
FIG. 1 is a side view of a prior art hook.

FIG. 1 shows a fishing hook 100 comprising a top end 101 defining an eyelet 109, said top end 101 extending down to inclined portion 102, which portion 102 extends down to shaft 103, which shaft 103 extends to a curved portion and to the barbed end portion 104. A mid section of hook 100 is defined as portion 102 and shaft 103 together. Prior art sizes of hooks 100 are shown in the table below. The numerical measurements in the table are measured in millimeters. The top row of the table are measurements corresponding to those shown in FIG. 1.

| SIZE | L/105 | T/106 | G/107 |
|------|-------|-------|-------|
| 1/0  | 39.5  | 15.2  | 14.6  |
| 2/0  | 42.8  | 16.4  | 15.8  |
| 3/0  | 45.9  | 18.3  | 17.3  |
| 4/0  | 51.7  | 20.0  | 19.1  |
| 5/0  | 55.2  | 21.6  | 20.8  |
| 6/0  | 61.5  | 23.5  | 22.8  |

Angle 108 between inclined portion 102 and 103 is about 150 degrees.

Figure 2:
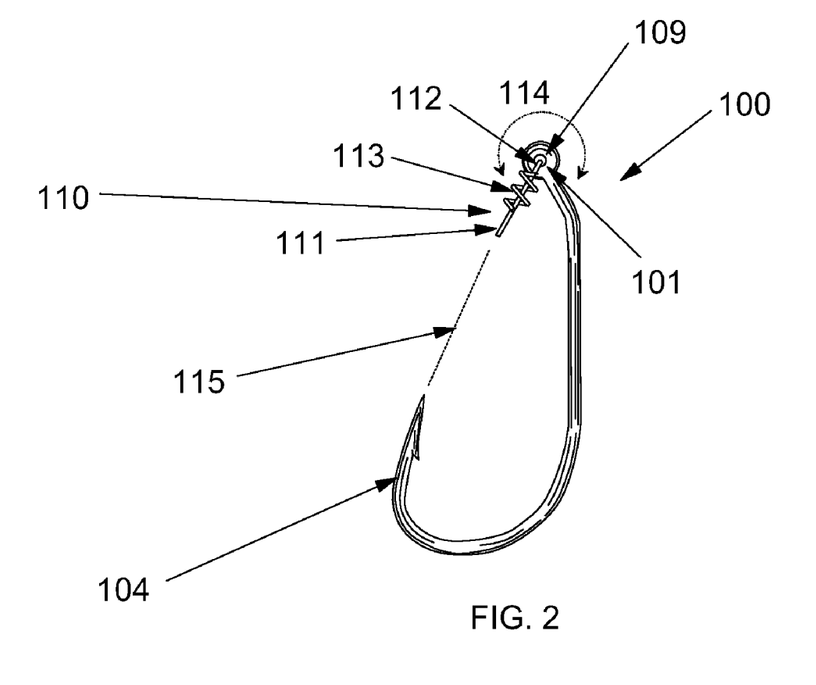
FIG. 2 is the hook of FIG. 1 bearing an invention connector from a top eyelet.

FIG. 2 shows invention connector 110 comprising an eyelet portion 112 which extends downward in two forms. First, portion 112 extends down to pin 111 (extending upward to portion 112 from a first free end of the connector). Second, portion 112 extends down to spiral 113 which circles an axis formed by pin 114 and terminates in a second free end of the connector at a higher elevation relative to the first free end of the connector. Spiral 112 comprises a free end 116 at a lower end. Portion 113 defines an opening by way of a loop of wire which passes through eyelet 109, thereby securing connector 110 with hook 100. Connector 110 is engaged with hook 100 at top end 101 so that connector 110 is capable of being rotated along broken line path 114, but is preferably maintained with pin 111 in alignment with broken line direction 115. In such an alignment, pin 111 is substantially in alignment with the barbed end portion 104 of hook 100.

Figure 3:
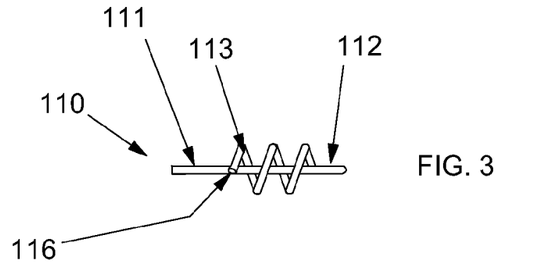
FIGS. 3 and 4 are side views of the invention connector of FIG. 2.
Figure 4:
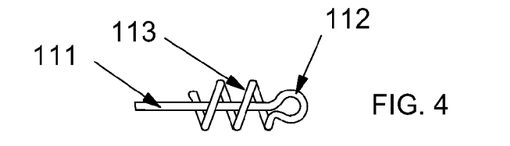
Figure 11:
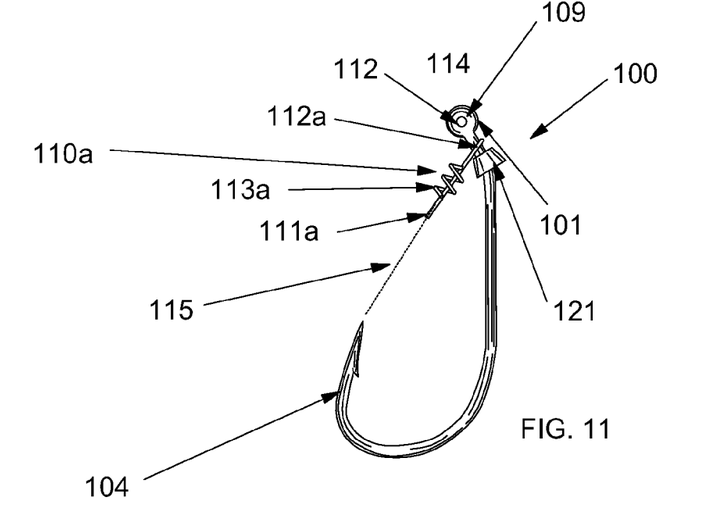
FIG. 11 shows the hook of FIG. 1 with an alternate embodiment of the invention connector fixed in position at an upper part of the hook by way of an elastomer plug.

FIGS. 3 and 4 are side views of the invention connector of FIG. 2, where it will be appreciated that connector 110 may be formed from a single, continuous piece of wire. In its preferred embodiment shown in FIG. 1, a piece of wire is first inserted into eyelet 109 of hook 100 to approximately the depth of pin 111, whereafter the remaining portion of the wire is wound around pin 111 to form spiral 113. FIGS. 2 and 3 show a form of connector 110 where spiral 113 is located with one end relatively close to portion 113. In another embodiment of the invention connector 110a in FIG. 11, pin 111a is somewhat longer and spiral 113a is formed somewhat farther down from portion 112a. An opening in portion 112a is large enough so that it will pass over the largest diameter of barbed end 104 of hook 100. Connector 110a is held in place next to top end 101 by way of a rubber or elastomer plug 121, which is impressed on the end of hook 100 and pushed along its length until it acts as a stay or stop for connector 110a.

Figure 5:
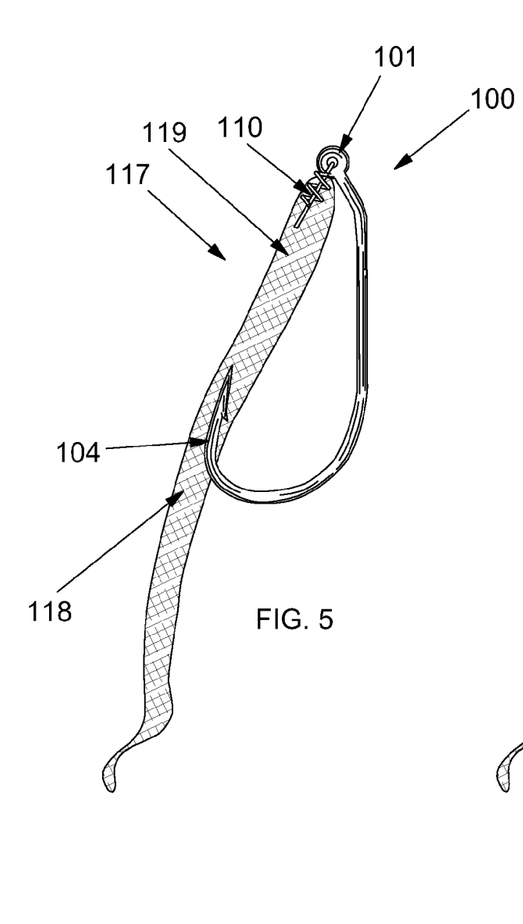
FIG. 5 is the hook and connector of FIG. 2 superimposed on a worm-type soft bait in orientation that said soft bait would be found in a secured position to the hook and connector.
Figure 6:
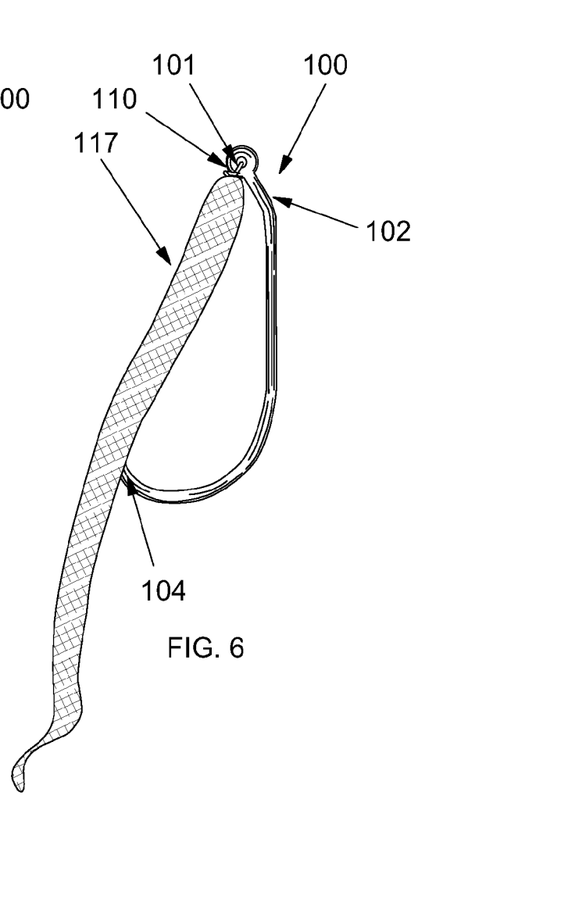
FIG. 6 shows the hook, connector and soft bait of FIG. 5 with the soft bait in a secured position.

The orientation and connection of a soft bait on a hook with the invention connector is now described. FIG. 5 is the hook 100 and connector 110 of FIG. 2 superimposed on a worm-type soft bait 117 in orientation that said soft bait 117 would be found in a secured position to the hook and connector. It will be appreciated that an upper end 119 will be located adjacent to top end 101 of hook 100 and that a lower end 118 of soft bait 117 will be located along barbed end portion 104. FIG. 6 shows the hook 100, connector 110 and soft bait 117 of FIG. 5 with the soft bait in a secured position. It will be appreciated that axial portions of soft bait 117 are secured at connector 110 and 104 in a line approximating broken line path 115 of FIG. 2. In this orientation, soft bait 117 prevents the entire rig from being snagged by weeds or limbs as it is drawn through the water.

Figure 7:
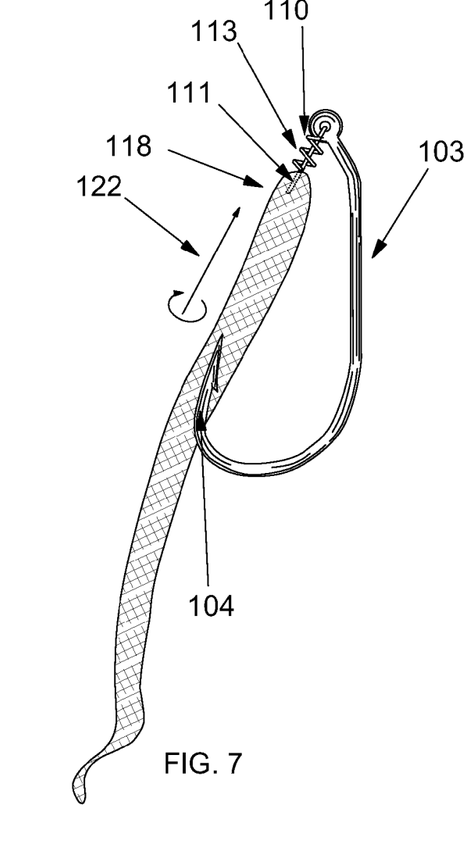
FIG. 7 is shows the hook, connector and soft bait of FIG. 5 with the soft bait being applied to the connector in a rotating motion.

FIG. 7 is shows the hook 100, connector 110 and soft bait 117 of FIG. 5 with the upper end 118 being applied to the free ends of pin 111 and spiral 113 connector in a pushing and rotating motion 122.

Figure 8:
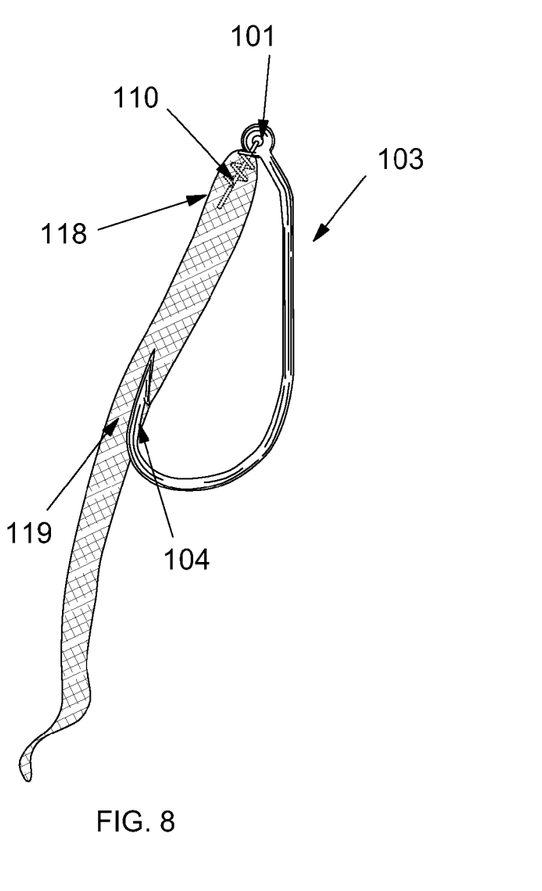
FIG. 8 shows the hook, connector and soft bait of FIG. 7 with the soft bait in a secured position on the connector.

FIG. 8 shows the hook 100, connector 110 and soft bait 117 of FIG. 7 with the upper end 118 in a secured position on the connector 110 (shown in broken lines as set within the soft bait 117.

Figure 9:
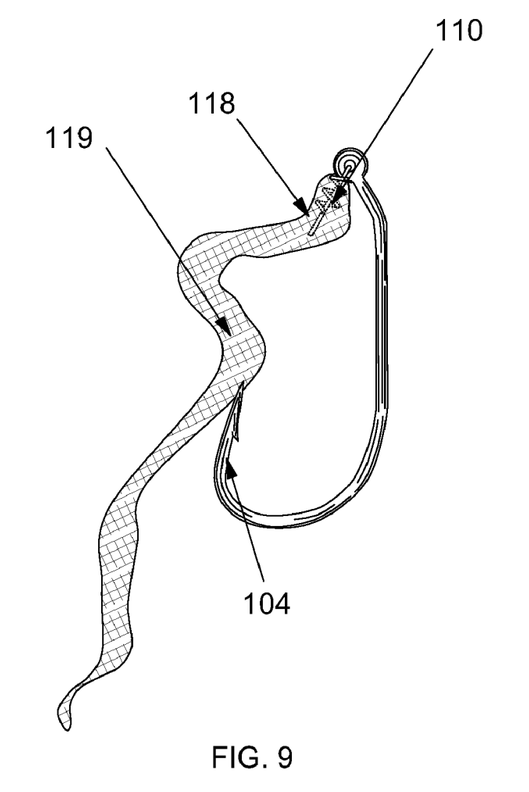
FIG. 9 shows the hook, connector and soft bait of FIG. 8 with the soft bait in a secured position on the connector and a lower end of the soft bait moved into position to be engaged to a barbed end of the hook.

FIG. 9 shows the hook 100, connector 110 and soft bait 117 of FIG. 8 with the lower end 119 moved into position to be engaged to the barbed end portion 104.

Figure 10:
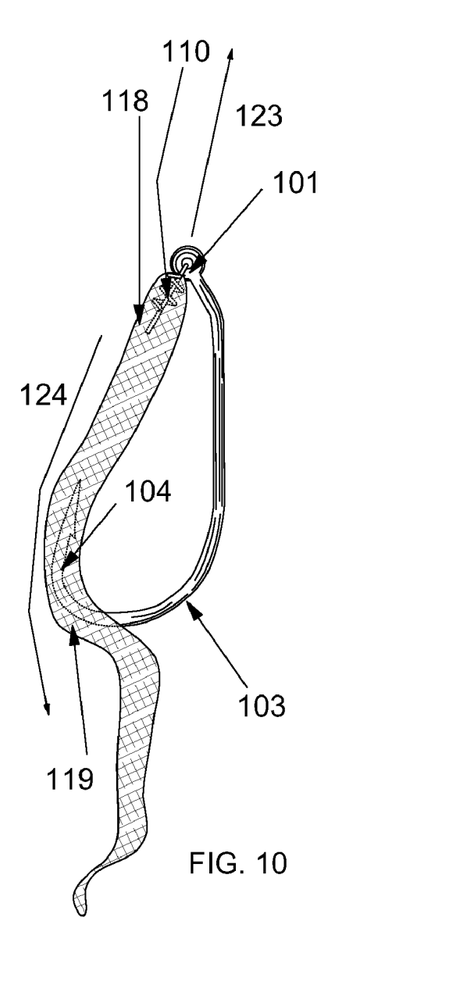
FIG. 10 shows the hook, connector and soft bait of FIG. 9 with the soft bait in a secured position on the connector and a lower end of the soft bait engaged to a barbed end of the hook.

FIG. 10 shows the hook 100, connector 110 and soft bait 117 of FIG. 8 with the lower end 119 engaged to the barbed end portion 104 (shown in broken lines). The rig of FIG. 10 drawn in direction 123 avoids snags passing in direction 124.

In a preferred embodiment, an overall length of the invention connector is from about 10 to 30 millimeters and has a spiral diameter of about 5 to 20 millimeters. In a preferred embodiment, the connector is formed from a single piece of steel wire having a thickness about one tenth to one fourth the diameter of the hook to which it is engaged.

The feature referred to as the straight pin adds to the invention connector surprising capability to center or enforce straight alignment of an upper portion of a soft bait secured to it. The prior art devices using only a spiral or coil suspended from an upper part of the hook in practice permit substantial lateral deformation of an upper part of a soft bait, which in turn causes undue agitation to the soft bait connection with the hook and adds drag resistance to the rig overall. These prior art devices have generally provided the user with a relatively short useful period in which the soft bait is secured at two locations to the metal portions of the rig. In contrast, the centering enhancement of the invention connector significantly extends that useful period of time by reducing drag and agitation of the hook to soft bait connection.

Figure 12:
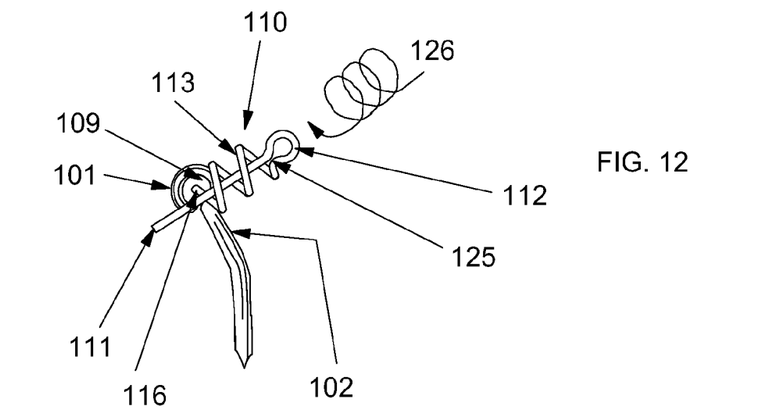
FIG. 12 shows the connector of FIG. 4 and a broken away section of the hook of FIG. 2 demonstrating orientation of the invention connector prior to spiral motion attachment to the eye of the hook.

The invention connector of FIGS. 3 and 4 can be connected to the eye of a hook by way of a screwing or spiral motion after a free end of the coil is inserted into the eye of the hook. The spiral motion is continued until the upper end of the invention connector is fixed in the hook's eye. The orientation of the invention connector 110 is shown in FIG. 12 with a broken away section of the hook of FIG. 2 with the eyelet 109 defined in top end 101. Eyelet portion 112 forms a loop whose ends touch or are brought close together at interface 125, which is adapted to be forced apart and spring back together. Spiral motion direction 126 is the direction a user will move connector 110 when free end 116 is inserted into opening eyelet 109, thereby threading coil 113 through eyelet 109 until the top end 109 encounters interface 125. At that time, a user will preferably use a slight amount of force to separate interface 125 so that eyelet portion 112 is engaged in eyelet 109, as shown in FIG. 2.

Figure 13:
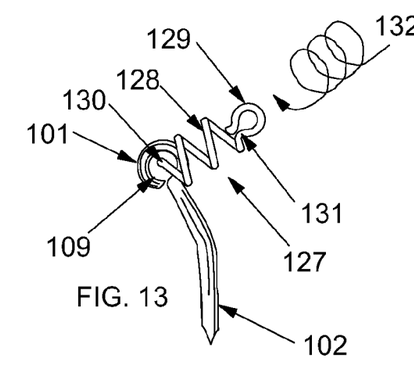
FIG. 13 shows a coil adapted with the upper end of the connector of FIG. 4 and a broken away section of the hook of FIG. 2 demonstrating orientation of an alternate invention connector prior to spiral motion attachment to the eye of the hook.
Figure 14:
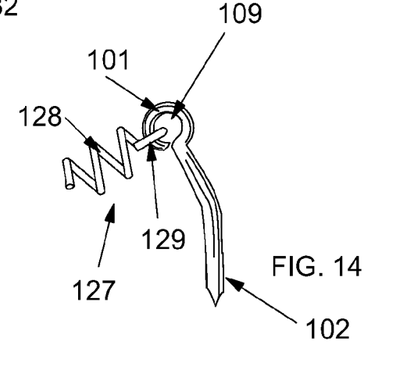
FIG. 14 shows the coil of FIG. 13 connected to the eye of the hook after spiral motion connection by a user.

An alternate form of the invention connector 127 is shown in FIGS. 13 and 14. Connector 127 is similar to connector 110 described above and shown in FIGS. 3 and 4, but simply lacks pin 111. Thus, connector 127 comprises a coil 128 and eyelet portion 129. Connector 127 can thereby be connected to the eye 109 of a hook by way of a screwing or spiral motion 132 after a free end 130 of the coil 128 is inserted into the eye 109 of the top end 101. The spiral motion is continued until the eyelet portion 129 of connector 127 is fixed in the hook's eye 109. FIG. 14 shows the connector of FIG. 13 connected to the eye 109 of the hook after spiral motion connection by a user.

Figure 15:
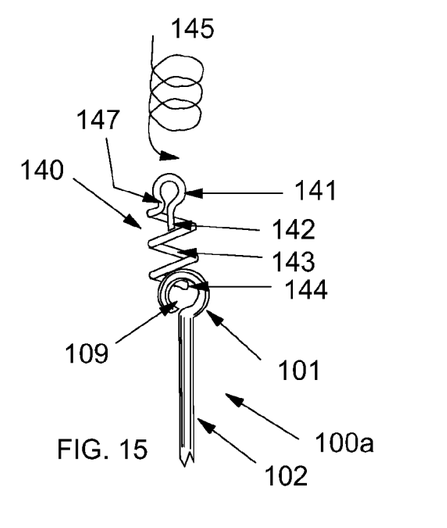
FIG. 15 is a side view of a mid length pin in the invention connector shown with a lower end of the coil positioned to be inserted into the hook eye of a broken away top section of a hook.

FIGS. 15 through 18 show a method of using the invention connectors so that they are wound about a top part of a hook shank and fixed in the hook eye. The coil connector of the FIG. 15 is a side view of a mid length pin in the invention connector shown with a lower end of the coil positioned to be inserted into the hook eye of a broken away top section of a hook. The prior art discloses a coil fixed to a top portion of a hook's shank. It is known to pierce a soft bait by a hook's sharpened end and thereafter move that end through the soft bait so that nearly the entire hook is encased in the soft bait. Locating a coil at the top part of the hook's shank helps secure the soft bait to the hook as the assembly is drawn through the water. A major difficulty in using the prior art device is the requirement that the metal coil be fixed to a metal shank by way of welding or soldering, both of which cause undue corrosion. The present invention connectors may all be used to locate a coil on the top part of the hook's shank similar to the method of the spiral motion connection just described above. Instead of allowing the coil to move through the hook's eye away from the hook's shank, the present embodiment and method require that the coil be rotated so that the coil becomes wrapped around the upper part of the hook's shank. When the eyelet portion of the invention connector encounters the top end of the hook, the interface between the eyelet portion and the coil is open to allow the top end to pass therethrough. The eyelet portion of the invention connectors are then fixed in the hook's eye so that the coil is secured in a position around the hook's shank without a welded or soldered connection.

FIG. 15 shows an invention connector 140 having an eyelet portion 141, a coil 143 (with a lower end 144), and a mid length pin 142. Lower end 144 is shown oriented to be passed through the eye 109 of the top end 101 of hook 100a. Hook 100a is similar to hook 100 of FIG. 1, except that hook 100a has a straight shank 102, which is preferable for fixing soft baits to the connector 140 when it is fixed to hook 100a.

FIG. 15 further shows that hook 100a is to be rotated in a spiral direction 145 so that lower end 144 passes through eye 109 and coil 143 is wound about shank 102.

Figure 16:
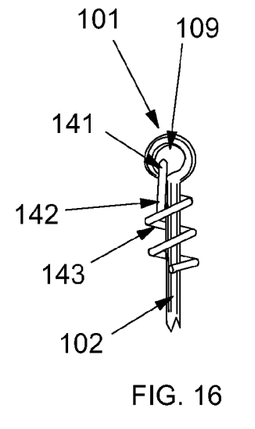
FIG. 16 is the invention connector of FIG. 15 spirally rotated through the hook eye and about a top part of the hook shank until the eyelet portion of the connector is fixed in the hook eye.
Figure 17:
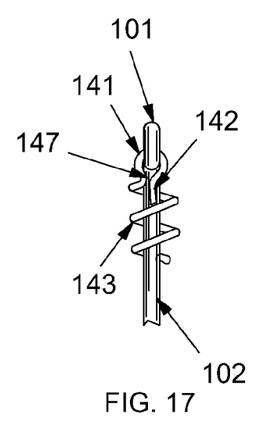
FIG. 17 is a front view of the assembly of FIG. 16.

FIGS. 16 and 17 shows the invention connector 140 in a position fixed to the hook with coil 143 secured in a position so that there is substantial space between the outside surface of shank 102 and an inside space within coil 143. FIGS. 16 and 17 show connector 140 after it has been spirally rotated through the hook eye 109 until the eyelet portion 141 of the connector is fixed in the hook eye 109 by opening interface 147 (FIG. 15) for passage of a part of top end 101 to pass through said interface 147. Interface 147 returns to its closed position as shown in FIG. 17 after being opened to fix the eyelet portion 141 to the top end 101.

Figure 18:
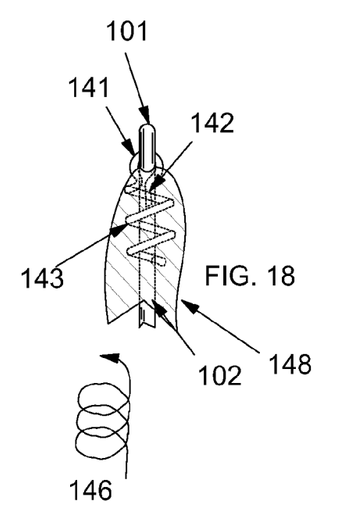
FIG. 18 is the assembly of FIG. 17 showing a broken away portion of a soft bait fixed on the coil of the invention connector and upon the shank of the hook.

FIG. 18 is the assembly of FIG. 17 showing a broken away portion of a soft bait 148 fixed on the coil 143 of the invention connector 140 and upon the shank 102 of the hook. It is preferred that soft bait 148 be rotated in an appropriate direction 146 so that it is fixed to coil 143 and shank 102.

The invention connector shown in FIGS. 15 through 18 may be replaced with any of the other invention connectors described herein, where all may be rotated in a similar fashion to secure a coil around a top portion of a hook's shank, fixed there by connection of the top end of the hook to the eyelet portion of the invention connector.

The present invention connectors may be adapted at the eyelet portion with alternate embodiments for securing the coil in its position about the hook's shank. The eyelet portion may comprise a flexible metal wire which will be wound about and through the hook's eye or may comprise a releasable latch that connects to the top end of the hook. The present invention connectors extends to all forms of non-welded and non-soldered methods of fixing a top end of the coil to the top end of the hook, preferably with some element passing through the hook's eye.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

I claim:

1. A fishing hook rig comprising:
   (a) a fishing hook comprising a top end defining an eyelet opening adapted to receive a fishing line, a mid section extending down from the top end, said mid section curving upward to extend to a barbed end portion, and said barbed end portion defining a barbed end axis;
   (b) a connector formed of a single piece of metal wire comprising a straight pin, an opening portion and a spiral, where the straight pin extends up from a first free end to the opening portion, the spiral is secured at an upper end to the opening portion or an upper part of the straight pin and extends down and around the straight pin so that the spiral does not contact the straight pin, a lower portion of the straight pin extends beyond a lower end of the spiral, and the spiral and a lower end terminates in a second free end; and
   (c) a connector opening is defined in the opening portion of the connector and is adapted to securely engage the top end of the fishing hook so that an axis of the straight pin of the connector is capable of lying generally co-linear with a pointed end or the axis of the barbed end portion of the fishing hook.

2. The fishing hook rig of claim 1 wherein a connector length from an upper end of the opening portion to a lower end of the straight pin is from 10 to 40 millimeters.

3. The fishing hook rig of claim 2 wherein the spiral has a diameter of from 5 to 20 millimeters.

4. The fishing hook rig of claim 3 wherein an annular space is defined between an inside surface of the spiral and an outside surface of the pin of from 2 to 25 millimeters.

5. The fishing hook rig of claim 1 wherein a rubber plug is secured to a portion of the mid-section just below the top end and prevents the connector from moving down the mid section.

6. A fishing hook rig comprising:
   (a) a fishing hook comprising a top end adapted to receive a fishing line, a mid section extending down from the top end, said mid section curving upward to extend to a barbed end portion, and said barbed end portion defining a barbed end axis;
   (b) a connector comprising a straight pin, an opening portion and a spiral, where the straight pin extends up from a first free end to connect to the opening portion and the spiral is secured at an upper end to the opening portion and extends down and around the straight pin to define an annular space;
   (c) the opening portion is engaged to the top end so that an axis of the straight pin of the connector is capable of lying generally co-linear with a pointed end or the axis of the barbed end portion of the fishing hook; and
   (d) a soft bait is secured at a soft bait upper end to the pin and spiral of the connector and at a soft bait lower end to the barbed end portion of the hook.

7. The fishing hook rig of claim 1 wherein the connector is formed a single piece of metal wire.

8. The fishing hook rig of claim 1 wherein a connector length from an upper end of the opening portion to a lower end of the straight pin is from 10 to 40 millimeters.

9. The fishing hook rig of claim 2 wherein the spiral has a diameter of from 5 to 20 millimeters.

10. The fishing hook rig of claim 3 wherein an annular space is defined between an inside surface of the spiral and an outside surface of the pin of from 2 to 25 millimeters.

* * * * *